United States Patent [19]

Morrow

[11] Patent Number: 5,573,063

[45] Date of Patent: Nov. 12, 1996

[54] DEEP WELL PUMPING APPARATUS

[75] Inventor: William B. Morrow, Bakersfield, Calif.

[73] Assignee: Harrier Technologies, Inc., Bakersfield, Calif.

[21] Appl. No.: 498,376

[22] Filed: Jul. 5, 1995

[51] Int. Cl.[6] .................................................. E21B 43/00
[52] U.S. Cl. ....................... 166/68.5; 417/423.6; 475/207
[58] Field of Search ........................ 166/68.5; 417/473.6; 475/207

[56] References Cited

U.S. PATENT DOCUMENTS 3,734,637  5/1973  Beck, Jr. ............................ 417/423.6
4,066,123  1/1978  Skinner et al. ......................... 166/68.5
4,475,872  10/1984  Foughty ................................ 166/68.5

Primary Examiner—William P. Neuder
Attorney, Agent, or Firm—Dennis B. Haase

[57]  ABSTRACT

A fluid recovery system for use in a relatively deep down hole environment in which a power source at the surface drives a high capacity pump through a power transmission disposed in proximity to the pump in the down hole environment and which power transmission drives the pump at a relatively high speed relative to the speed of the power source.

14 Claims, 2 Drawing Sheets

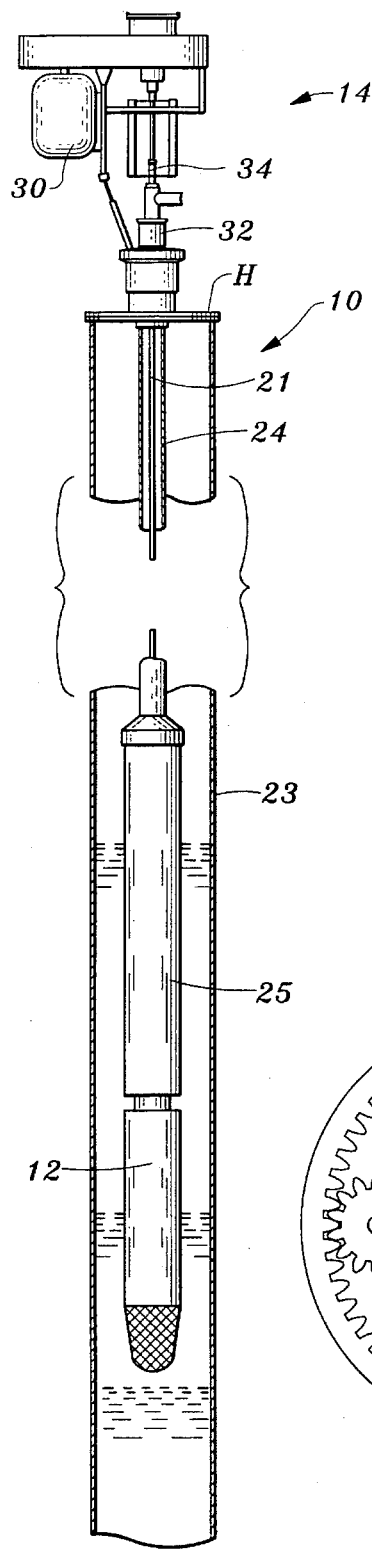
Fig. 1
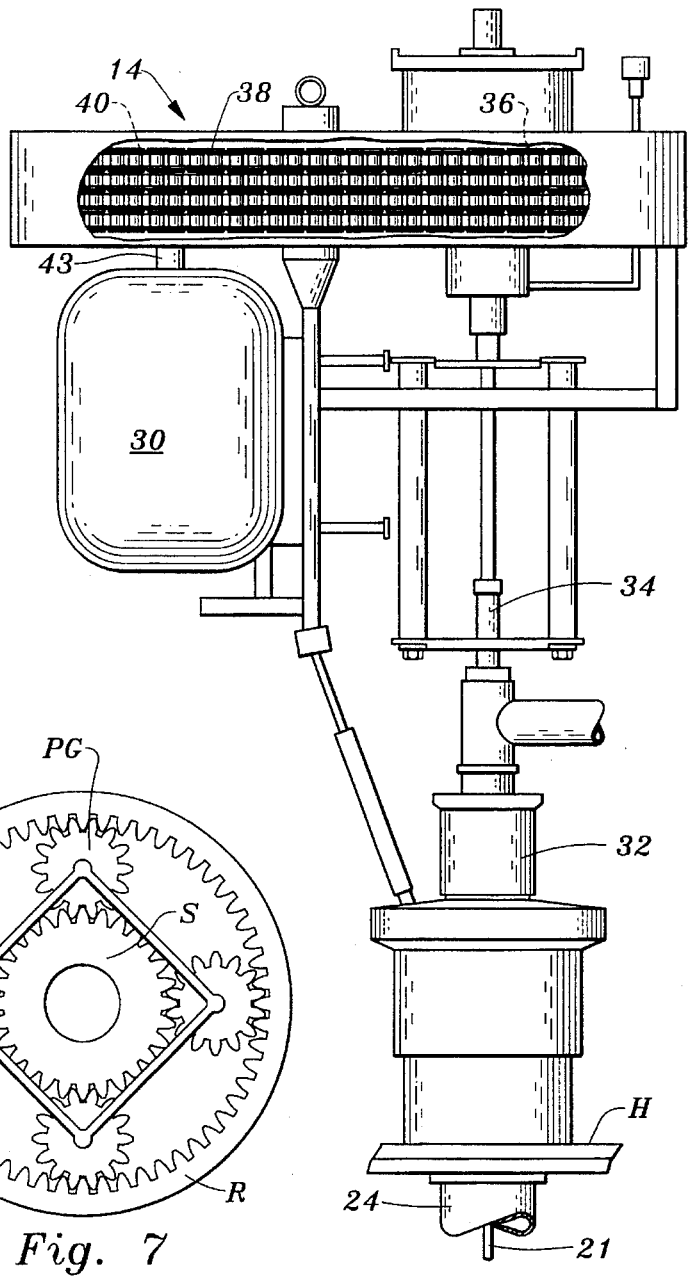
Fig. 7
Fig. 2

DEEP WELL PUMPING APPARATUS

The present invention relates generally to the pumping of fluids from subsurface deposits and, more particularly, to apparatus for achieving higher rates of delivery from relatively deeper oil wells, i.e., wells having deposits below 1,000 feet from the surface.

BACKGROUND OF THE INVENTION

1. Field of the Invention

The present invention is singularly directed to the production of oil from subsurface deposits, primarily below 1,000 feet. Unlike systems used for the recovery of less viscous fluids, water by way of example, the recovery of oil is required to be accomplished from relatively deeper deposits, using significantly smaller diameter casing.

By way of example, water pumping systems, by virtue of the use of casing diameter of 12 inches and greater, are able to make practical use of higher RPM pumps, which are, by nature, larger in diameter. Moreover, because of the relatively shallow nature of such wells, such pumps are easily driven from a source of power located at the surface. This is because the drive shaft for transmitting motive power to a high revolution pump is coincidently shorter, and the amount of bearing support required is within practical limits. Clearly, the longer the drive shaft, the more bearing support required, with a commensurate increase in construction and maintenance costs.

Yet another distinguishable difference between oil and water wells is the inevitable presence of natural gas in an oil deposit, which is not found in water deposits. Oil wells accommodate gasses by using a conduit within the casing to relieve pressure and harvest the gasses. Remembering that oil well casings are typically less in diameter, the use of agricultural and other water recovery systems which are 12 inches and more, would be extremely difficult to adapt to oil production.

Mechanical lifting of oil from subsurface deposits is a common, indeed necessary, means of producing the world's hydrocarbon energy needs. The apparatus for accomplishing this needed task falls predominantly into five strategies or categories: rod pumping, gas lift, hydraulic pumping, electric submersible pumping, and progressive cavity pumping. Each type has its strong and weak points.

Rod pumping, the most common type of artificial lifting apparatus, consists of a piston type pump located downhole where it is submersed in the deposit in the well. The technique is to actuate the pump with a reciprocating rod string extending from the downhole pump to a pumping unit at the surface. This type of system is reliable, easily serviced, and satisfactory for most wells. However, rod pumping is not particularly well suited to deep, gassy, or abrasive fluid applications, i.e., where sand, salts and like particulate is found in the deposit, and has limited rate and depth capability due to the tensional strength limitations of the rod string.

Yet another problem with such systems becomes evident if a rod string breaks, and such is not uncommon. The cost in both time and effort to fish out the pump from the bottom of the well, repair or replace the string, and return the pump to the appropriate depth, is high, yet borne regularly by those in the business, because there is no other way. The deeper the well, of course, the longer the string, and the greater the load on the string as it is reciprocated to operate the pump. Not surprisingly, the rate of failure of such strings is significantly higher.

Another fluid recovery system in wide use is referred to generally as a gas lift system and consists of injecting high pressure gas into a fluid filled tubing at depth, to lighten the fluid column, and cause the fluid to flow to the surface. Gas lift systems work well in moderate rate, moderate depth applications. It is insensitive to gassy or abrasive fluids, because the equipment is mechanically simple and inexpensive, and the systems are very reliable. Gas lift requires a source of gas, is energy inefficient, expensive to run and operate because of the compression requirements, and a poor option in low rate applications.

The currently preferred option for production of deep, low to moderate rate wells is referred to simply as hydraulic pumping. A typical system consists of a downhole piston pump which is connected to a downhole piston motor. The motor is actuated by high pressure hydraulic fluid injected down a string of tubing to the downhole pump-motor assembly. The reciprocating movement of the motor actuates the pump, which lifts the fluid in the deposit to the surface.

The tradeoff with hydraulic pumping is that hydraulic pumps are expensive to install and operate, and do not handle abrasive or gassy fluids well. They require high pressure hydraulic pumps at the surface, hydraulic fluid (usually crude oil) storage and treating facilities, and at least two strings of tubing.

Hydraulic jet pumps employ identical surface equipment and tubing requirements used in hydraulic pump systems such as described above, but replace the piston pump/motor assembly with a venturi-type jet assembly that uses Bernoulli's principle to "suck" the produced fluid into the stream of hydraulic fluid passing through the jet. The mix of hydraulic and produced fluid crude then flows up to the surface. Hydraulic jet pumps handle gassy fluids well, but are limited in the effective draw down they can generate and are energy inefficient.

A more recent approach to producing subsurface deposits has become available with the commercial exploitation of the progressive cavity pump.

Progressive cavity pumping (PCP) consists of a Moyno type pump downhole, which is actuated by a rod string that is rotated by a motor at the surface. PCPs are particularly well suited for delivering viscous, abrasive fluids. The surface and bottom hole equipment is simple and reliable, and energy efficiency is good. Progressive cavity pumps handle gas satisfactorily, but the system has depth and rate limitations and will mechanically fail if the volume of fluid entering the pump is less than what the pump can lift, and the well "pumps off".

Overview of Germane Prior Art

The foregoing is intended to provide a pictorial view of a variety of production systems that have been, and continue to be, in use throughout oil producing countries. The present invention, however, is more specific in its focus, and the relevant art, therefore, is more specific, to the extent that any really exists.

By way of example, for high to very high rate applications, i.e., in excess of 1,000 barrels per day, there currently is only one generally accepted option for most field applications, and that is the electric submersible pumping (ESP). The ESP system consists of a multi-stage, downhole, centrifugal pump directly driven by a downhole electric motor.

Electric power for the motor is transmitted from the surface to the motor via an armored cable strapped to the tubing. ESPs offer a very wide range of rates and pumping depths, require a minimum of surface equipment (if a central electrical power source is available), and are reasonably energy efficient. They do not handle gassy or abrasive fluids well, and are rather inflexible with regard to varying rate capability of an installed unit. If power is not available at the well site, an electric generator driven by a gas or diesel engine is required.

ESPs, on the other hand, are typically expensive to purchase, service and operate, and with crude prices constantly in a state of flux, any system that can be cost effective is going to be of great value. The principal reason for the high cost of operating an ESP is the submersible electric motor. Because the motor must operate in a hot, saline water environment at high speeds and voltages, they are exotic and, hence, expensive to purchase and overhaul. ESPs are also very susceptible to power interruptions, have a strict power interruptions, have a strict temperature limitation, and are the weak point of an otherwise excellent high volume lift system.

If a well environment is sandy, or contains abrasive or corrosive salts, friction at the pump is materially increased, with a commensurate increase in the load on the pump. If there are gas deposits in the area of the well, and it is not uncommon in deep wells, pumps, and particularly positive displacement pumps which are in common use, become highly inefficient, and proportionately more expensive to use.

The Geared Centrifugal Pumping system combines the high lift capacity of the ESP with the drive simplicity of the progressive cavity pumping system. Basically, the system consists of an electric motor and speed reducer at the surface, which turns a rod string connected to a speed increasing transmission/submersible downhole pump assembly (FIG. 1). The speed reducer is needed at the surface because there is a limit to how fast a rod string can be turned stabley. Experience with progressive cavity pumps has shown that rod string speeds of 500 RPM are about as fast as can be maintained reliably. The transmission increases the input rotational speed of the rod string from about 500 RPM to the 3,000 to 3,500 RPM needed to operate the submersible pump, which is attached to the bottom, output end of the transmission (see FIG. 1). Production enters the centrifugal pump inlet, flows up through the stages of the pump, flows around the transmission, and into the tubing, and up to the surface.

The GCP is similar in concept to the common agricultural submersible pumps, which are also driven by a surface motor turning a shaft that extends down to the multi-stage centrifugal pump downhole. In the agricultural application, there is no downhole transmission, as the motor, shaft and pump all turn at the same speed, about 1,600 RPM. They are able to turn the assembly this fast because the shaft is run inside a tubing string with stabilizing bearings run at 10 foot intervals, an impractical configuration for the much deeper oil wells.

An agriculture pump, running at only 1,600 RPM, is able to generate sufficient head per stage to lift water several hundred feet by virtue of the large diameter of the pump, made possible by the large diameter of the water wells (the head, or pressure each stage generates is proportional to the diameter of the pump rotor). Since oil wells typically have inside diameters in the 6 inch to 8 inch range, and oil wells are usually much deeper than water wells, ESPs typically run in the 3,000 to 3,500 RPM range to generate sufficient head per stage to keep the number of stages down to a manageable number (the head per stage is proportional also to the square of the rotational speed). Even at these high rpms, ESPs frequently will have 200+ stages to allow the lifting of fluid from several thousand feet.

The problem addressed by the present invention is how to incorporate the best features of known apparatus into a high output, low maintenance system.

Overview of the Patent Art

There are a few patented, and many unpatented, devices in the field which represent the efforts of those in the art to find a reliable, high capacity, deep well pumping system. The most common approach is still to use a downhole positive displacement pump driven by the rod string which is rotated or reciprocated by a surface power source.

Ortiz U.S. Pat. No. 3,891,031 is specifically directed to deep wells and a seal in the well casing which would permit the casing to become a part of the delivery system.

Justice U.S. Pat. No. 4,291,588 suggests a system for stripper wells, having bore diameters of about 4 inches. This specific patent addresses a step down transmission disposed between an electric motor and a positive displacement pump. It is presumed that other divisionals of the parent application address the system as a whole.

Garrison U.S. Pat. No. 4,108,023 addresses a step down transmission for use in a drill rig wherein drilling mud is capable of bypassing the transmission to lubricate the bit without invading the system itself.

Weber U.S. Pat. No. 5,209,294 is illustrative of a progressive cavity pump. Such pumps, however, operate at speeds from 300 to 1200 rpm, and their delivery rate is not optimum for deep well applications. A similar pump is shown in Cameron U.S. Pat. No. 5,275,238, although the essence of the patent is directed to objectives other than the pump per se.

It is also recognized that there are some higher speed applications in the agricultural field, that is in the neighborhood of 1200 to 1600 rpms, and typically driving a turbine pump. Unlike the present invention, however, these systems require that the drive shaft to the pump be encased, and bearings provided between the casing and the drive shaft to prevent the drive shaft from destruction during operation.

As will become apparent from a reading of the following description of a preferred embodiment of the present invention, none of the prior art efforts adequately address the practical problems long suffered by producers with respect to high rate deep wells.

SUMMARY OF THE INVENTION

The present invention addresses problems such as production efficiency, inherently more difficult in deeper oil wells, by an innovative pumping system that permits the use of high production pumps, such as multi-stage centrifugal pumps, in a deep oil well environment, without the drawbacks of the systems currently in use.

Accordingly, means has been devised for the use of a novel gear arrangement for driving a centrifugal pump, sometimes referred to herein simply as a Geared Centrifugal Pump (GCP) system. As disclosed in detail hereinafter, a GCP system is an artificial fluid lift system, having as a principal objective the ability to replicate the advantages of the ESP without the cost and operational problems of the submersible motor.

It is a further objective of the present invention to provide deep well producers with a pumping system that will optimize their production without a material increase in the cost thereof.

Another objective of the present invention is to provide a pumping system that will permit the use of high speed centrifugal pumps in a deep well environment without the attendant high costs otherwise associated with the operation of submersible downhole electric motors.

Still another objective of the present invention is to effect pump operation without the need of supporting the rod string in special bearings, while maintaining a high degree of reliability in the entire system.

Another, and still further objective of the present invention, is to provide deep well producers with an efficient delivery system which is both high volume and low maintenance, thereby making such wells more economical and coincidently more productive.

The foregoing, as well as other objects, benefits and advantages of the present invention will become apparent from a reading of the detailed description of a preferred embodiment of the invention, when read in conjunction with the drawings, wherein:

DESCRIPTION OF THE DRAWINGS

FIG. 1 is a side elevation of a deep well, partially sectioned and fragmented, to illustrate the pumping system of the present invention in a typical environment;

FIG. 2 is a side elevation of an exemplary drive assembly disposed in the well head, for rotating a rod string;

DETAILED DESCRIPTION OF A PREFERRED EMBODIMENT

Figure 3:
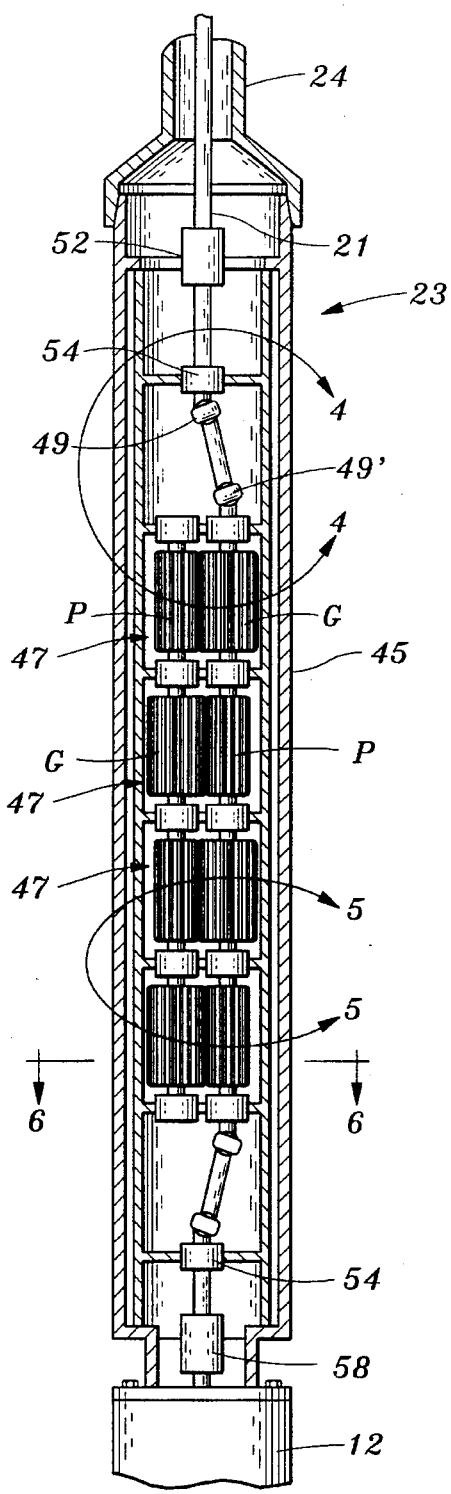
FIG. 3 illustrates one of several step up transmissions capable of being used in the system of the present invention.

With reference now to the drawings, and initially to FIG. 1, a deep well, high capacity pumping system, constructed in accordance with the present invention, is illustrated at 10, in a typical deep well environment.

The system 10 is made up of several elements, including a high capacity centrifugal pump 12. The pump 12 is, in accordance with the invention, a multi stage pump, chosen because of its capacity to deliver relatively high volumes of liquid under significant head pressures, which are commonly experienced in a deep well environment.

The advantage in using a multi stage centrifugal pump, or any comparable configuration, is that it is a high capacity delivery device. In order, however, to deliver the capacity of which the device is capable, such pumps currently available require an operating speed of up to 3,500 revolutions per minute, whereas surface power units such as the one illustrated at 14, are able to operate efficiently at about 500 rpm.

In order to deliver the kind of driving force necessary to efficiently operate the pump, it has been the industry approach to place a high speed electric motor downhole, either contiguous with, or in close proximity with the pump, and run electric power to the motor from a source located on the surface.

Such a construction has an inordinately high initial cost, and a commensurately high maintenance cost, neither of which are compatible with market volatility, and both of which compromise the benefits otherwise derived from the use of high capacity pumps.

The tradeoffs in systems such as the electric submersible pump (ESP) type systems previously referenced, has accentuated the need for exploration into ways to employ high capacity pumps in deep wells. Enter the present invention, which involves the use of a relatively low cost, low maintenance surface drive unit 14, of well known construction and readily available, disposed at the well head H. The surface drive unit 14, which may employ any suitable energy source, depending on availability, engages, to rotate a rod string 21, which extends down the well casing 23 where it ultimately connects to one of the gears which comprise a transmission 25 for the purposes of driving the pump 12.

As illustrated, the rod string is encased in a tubular member 24, for reasons that will become more clear as this discussion proceeds.

However, other problems are created when an attempt is made to drive the pump at the required speeds from the surface of the well. Specifically, the torque on the rod string 21, which is typically made up of a series of sections of either solid rod, or pipe fastened to one another, such as by welding, or other well known means, causes the application of destructive forces which can quickly debilitate such a string when operated at speeds greater than about 1,000 rpm.

The elements of a rod string are not, in the usual case, dynamically balanced and when rotated at relatively high speeds will inevitably tend to vibrate. Within a well casing, the amplitude of such vibration could easily be such as to cause portions of the casing to be contacted by portions of the rod string, reeking havoc on both. Moreover, the twisting movement on the rod string is amplified by its length, and a torsional fracture is to be anticipated.

The present invention resolves this dilemma by providing the transmission 25, disposed between the drive unit 14 and the pump 12. The transmission 25 is preferably disposed in close proximity to the pump 12, and may even be connected to its case in order that the rod string 21 is minimally effected by the rotation imparted to it by the drive unit 14 and provide a step up in rotational speed of 1:3 or greater.

With particular reference to FIG. 2, in order, therefore, that damage to the rod string can be exacerbated, the drive unit 14, as illustrated, employs an electric motor, which may turn at any sufficient speed to deliver the force necessary to rotate the rod string. The drive unit 14 reduces the motor RPM (typically 1,600 rpm) to a speed at which the rod string can be rotated stably, about 500 rpm.

As illustrated, a portion of the rod string protrudes upwardly through and above the stuffing box 32, at 34. A pulley 36 is affixed to the end of the rod string 34, and belts 38 interconnect the electric motor 30, which also has a pulley 40, mounted to its drive shaft 43. While a gear drive might serve the purpose, by use of belts, a certain dampening effect is achieved which will extend the life of the system.

The pulleys 36 and 40 are sized to effect a speed reduction, and this is accomplished by making the effective diameter of the pulley 36 larger than that of the pulley 40. In this way a reduction, in this example 2.5 to 1, is effected in order that the rod string can be driven at a safe speed, such as 500 rpms.

Figure 4:
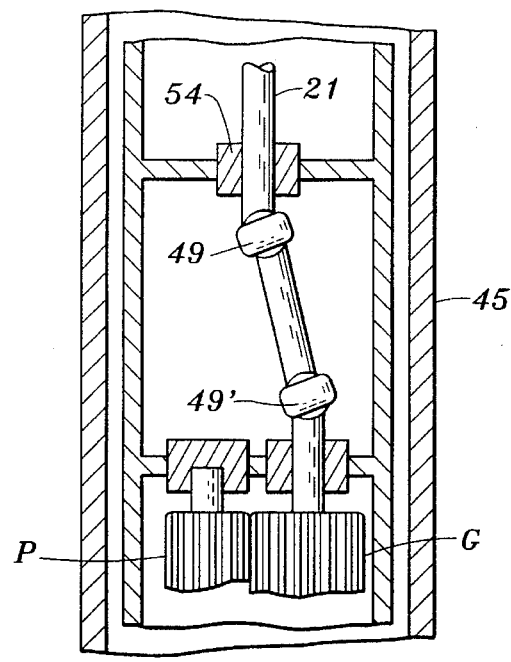
FIG. 4 is a sectional view of the area inscribed by 4—4 of FIG. 3, illustrating certain features of the system.
Figure 5:
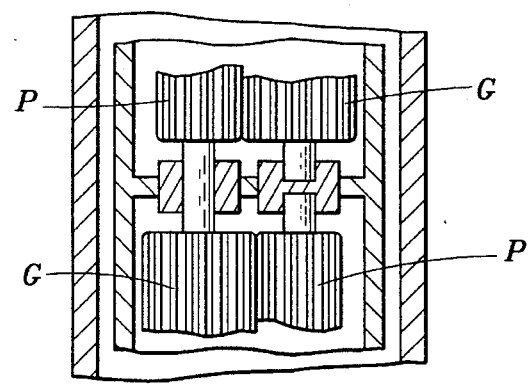
FIG. 5 is a sectional view of the area inscribed by 5—5 of FIG. 3.
Figure 6:
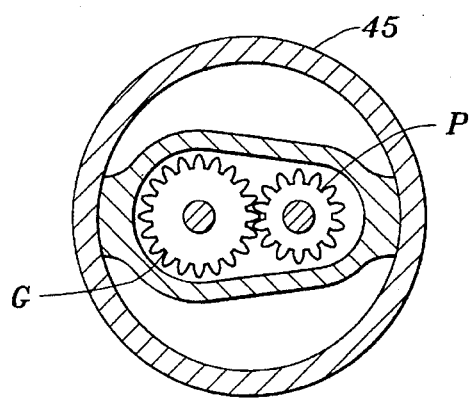
FIG. 6 is a cross sectional view of a portion of the transmission of FIG. 3, taken along section 6—6 of FIG. 3; and, FIG. 7, is a pictoral representation of what the cross section of FIG. 6 would look like if a planetary gear set were used in place of the gear and pinion arrangement of FIG. 6.

In order to obtain maximum efficiency from the pump submersed in the well, the transmission 25 must increase the speed of the rod string to the transmission several fold. To accomplish this, as illustrated in FIGS. 3, 4, 5 and 6, a step up transmission is employed, exemplary of which is the gear and pinion type transmission depicted in FIG. 3.

The transmission 25 comprises a casing 45, which attaches to, and is held in place in the well by tube 24. The casing thus serves as a reaction member against which the operative elements within the casing, may react. More specifically, the transmission employs a series of pinion and gear sets 47. The gear G is driven through one or more constant velocity joints 49, of well known construction, in order to assure smooth and uniform transfer of power from the rod string 21. The integrity of the system is further enhanced by the use of a safety coupling 52, disposed in the rod string just above the transmission, and a bearing 54 just below the safety coupling. This arrangement ensures proper alignment with the transmission, and inhibits the effects of imbalance in the rod string which might contribute to vibration.

While a gear and pinion arrangement is illustrated, it will be appreciated that a planetary system as exemplified in FIG. 7 is well within the purview of the invention, and such a system might, indeed, obviate the need for CV joints 49. In such a case, a sun gear S is engaged by a series of planet gears PG and by a ring gear R. In keeping with the underlying premise of the present invention, the ring gear is fixed and the planetary gear set will be driving and the sun gear set driven in order to get the increase in RPMs necessary to achieve optimum output by the pump.

Having described a preferred embodiment of the invention, and some variations on aspects thereof, what is claimed is:

1. A fluid recovery system for use in producing oil and water from a relatively deep, subsurface deposit, comprising, in combination:

a high capacity pump, said pump being immersed within said deposit;

a well casing extending from the surface above the deposit and into the deposit;

a source of motive power, disposed on the surface, for producing rotary motion;

power transmission means interconnecting said power source and said pump within said well casing, said power transmission means including a step up transmission, a rod string, said rod string interconnecting said power source and said transmission for delivering rotary motion to said transmission, and said transmission being connected to said pump so as to deliver a relatively higher speed rotary power to said pump.

2. The novel fluid recovery system as set forth in claim 1, wherein said pump comprises a high capacity centrifugal pump.

3. The device as set forth in claim 1, wherein said power transmission comprises a gear, a pinion mated with said gear, and said gear and pinion together comprising a gear set, said gear set being bearing mounted in a casing, said casing being disposed within said well casing between said pump and said power source.

4. The novel fluid recovery system as set forth in claim 1, wherein said power transmission comprises a planetary gear set, said planetary gear set being bearing mounted in a casing, said casing being disposed within said well casing between said pump and said power source.

5. The novel fluid recovery system as set forth in claim 1, comprising a rod string, said rod string interconnecting said power source and said transmission, and being rotatable by said power source to drive said transmission, a tubular member, said rod string being encased within said tubular member, bearings interposed between said rod string and said tubular member to provide bearing support for said rod string.

6. The novel fluid recovery system as set forth in claim 2, wherein said power transmission comprises a gear, a pinion mated with said gear, and said gear and pinion together comprising a gear set, said gear set being bearing mounted in a casing, said casing being disposed within said well casing between said pump and said power source.

7. The novel fluid recovery system as set forth in claim 2, wherein said power transmission comprises a planetary gear set, said planetary gear set being bearing mounted in a casing, said casing being disposed within said well casing between said pump and said power source.

8. The novel fluid recovery system as set forth in claim 3, wherein said transmission casing and said pump are connected.

9. The novel fluid recovery system as set forth in claim 4, wherein said transmission casing and said pump are connected.

10. The novel fluid recovery system as set forth in claim 2, wherein said centrifugal pump functions at an optimum speed in excess of 3,000 rpm.

11. The novel fluid recovery system as set forth in claim 1, wherein said well casing has an inside diameter less than 12 inches.

12. The novel fluid recovery system as set forth in claim 1, wherein the fluid deposit is at a depth greater than 1,000 feet.

13. The novel fluid recovery system as set forth in claim 1, wherein said transmission has a step up ratio of at least 1:3 or greater.

14. The novel fluid recovery system as set forth in claim 11, wherein the fluid deposit is at a depth greater than 1,000 feet.

\* \* \* \* \*